Oct. 15, 1974     T. G. BARNES     3,841,984

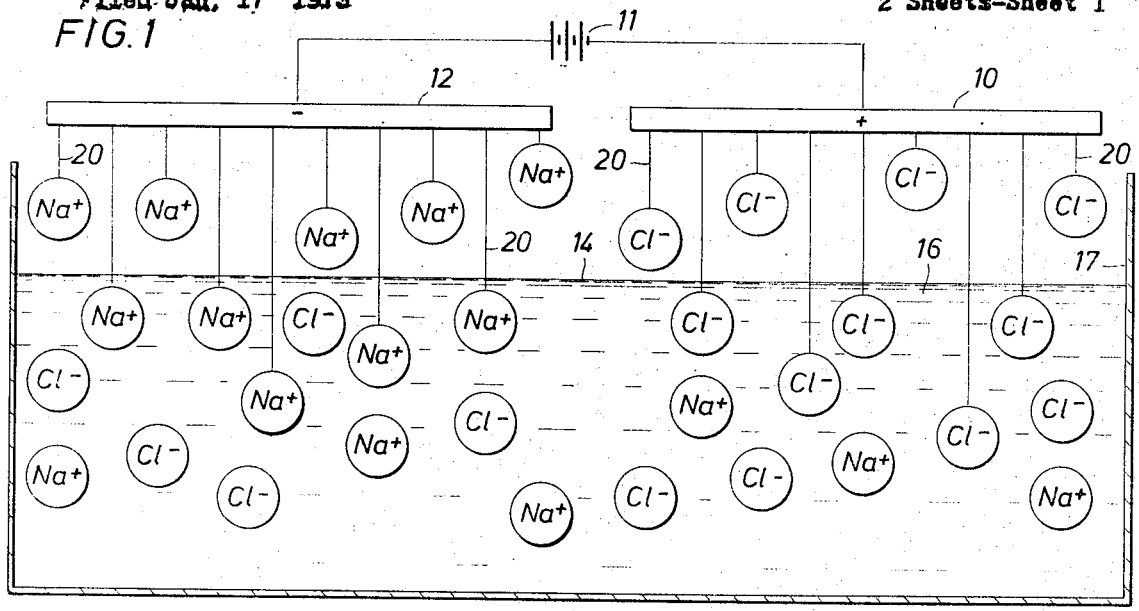
FIG. 1
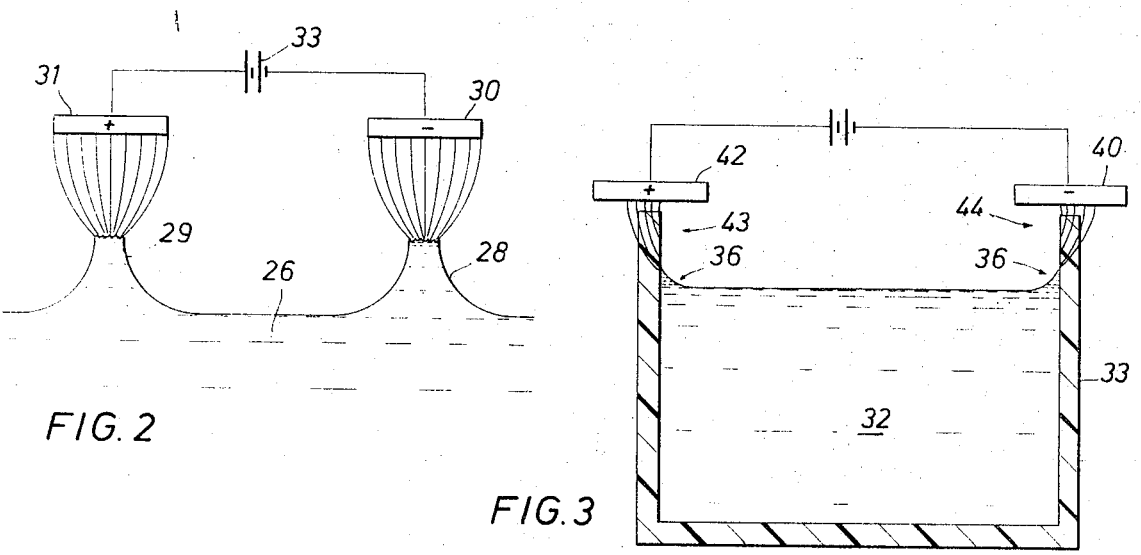
FIG. 2
FIG. 3
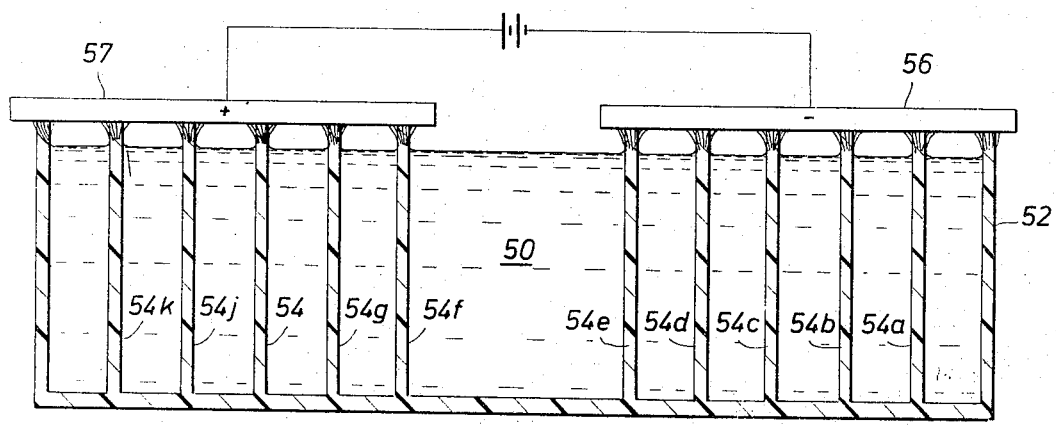
FIG. 4

ELECTRO-EXTRACTION PROCESS

Filed Jan. 17, 1973     2 Sheets-Sheet 2

United States Patent Office 3,841,984
Patented Oct. 15, 1974

3,841,984
ELECTRO-EXTRACTION PROCESS
Thomas G. Barnes, El Paso, Tex., assignor to Globe Universal Sciences, Inc., Houston, Tex.
Filed Jan. 17, 1973, Ser. No. 324,447
Int. Cl. C02c 5/12
U.S. Cl. 204—149                                            29 Claims

ABSTRACT OF THE DISCLOSURE

A novel electric means is provided for extracting ions from ionized solutions such as salt water. A high intensity electric field is focused upon a small area of the surface of a solution containing ions which are attracted by the electric field and given sufficient escape energy to move out of the surface of the solution. A weaker electric field transports the ions on over to an external electrode. The ions are electrically neutralized at the electrode into uncharged elementary chemicals separately related to the ions, and collected as chemical products outside of the solution. The process has particular utility in the desalinization of salt water from which the sodium and chlorine ions are removed and products of sodium or sodium compounds and chlorine or chlorine compounds are produced.

BACKGROUND

The present invention relates to a novel electric means of extracting ions from ionized solutions, which I call "electro-extraction." It includes electric means for desalinization of saline water by extracting sodium ions, chlorine ions and the ions of other salt. Similarly, it includes the extraction of any other ionized minerals from their mineral solution.

There are three processes commonly in use for desalinization and demineralization (purification): ion exchange, reverse osmosis, and distillation. All three of these processes have certain disadvantages insofar as their use for commercial desalinization is concerned. Electro-extraction according to the present invention differs from all previous types of deionization or desalinization processes. The ion exchange processes do what the name implies, exchange ions for ions in the solution, taking out one kind of ion from the solution and replacing it with another kind of ion which is obtained from a supply of chemicals used in the process. The ion exchange process has the disadvantage of requiring a large amount of chemicals (resins) in physical contact with the solution. These chemicals "wear out" and must either be replaced or recharged as they lose their initial chemical composition. The ion exchange process is not economical for many applications, such as the desalinization of sea water. Furthermore, it does not yield any commercial chemical by-products whose value might reduce the overall cost of desalinization.

Electro-extraction differs from the reverse osmosis and electrodialysis processes which have been used for water purification. Those processes all require expendable membranes and high pressure to move the water molecules through these membranes. Furthermore, those processes are increasingly less efficient with solutions with higher ion content requiring much more pressure and contaminating membranes much more rapidly; for example, they are not practical for purifying seawater.

Furthermore, none of the previous types of purification processes are able to yield by-products that are separately related to the anions and cations in the solution as is true of the electro-extraction process. The efficiency of electro-extraction for desalinization stems partly from the fact that only the impurities are removed and the impurities are a small fraction of the total solution. For example, seawater has 3.5% salt impurities and 96.5% water. The energy required to extract 3.5% impurity is much less than required to extract 96.5% water. Reverse osmosis and distillation processes require the energy necessary to extract 96.5% water as compared to the electro-extraction process which requires energy necessary to extract only the 3.5% salt. With lesser concentration of impurity, such as in brackish water, this efficiency advantage is even greater for the electro-extraction process.

SUMMARY

The electro-extraction process makes use of an externally applied electric field to cause ions in a solution to achieve an escape energy and leave the surface of the solution. The end results of this electro-extraction process are two-fold: purification of the solution and production of useful chemical products. In the case of saline water, the water is purified and the products are sodium (or sodium compounds) and chlorine (or chlorine compounds). If other salts are contained in the solution they are also extracted in the process, leaving a purified solution, and yielding additional chemical products.

Salts and other minerals in solution dissociate into positive and negative ions, whereas the solution molecules such as water molecules, do not dissociate in any appreciable amount. Electro-extraction differentiates between the charged ions and uncharged solution of molecules, extracting the ions but not the solution of molecules. Electro-extraction of a high percentage of the ions yields a highly purified solution and a proportionate amount of chemical products.

Electro-extraction makes use of the fact that an electric field E exerts a force $F=qE$ on an ion with charge $q$. An electric field is employed to move the ions within the solution to an appropriate location where the ions are extracted out of free surfaces by means of electric fields of the proper magnitude and direction. The electric fields are induced by external electrodes that are connected to an electric source of potential. The electro-extraction process is accomplished without physical contact between the electrodes and the solution; there is a gap between each electrode and the solution. This isolation and insulated configuration of the electrodes with respect to the solution keeps the solution itself free of chemical reaction because no charge, neither positive no negative, is allowed to go from the electrodes to the solution. Any chemical reactions that would have taken place within the solution in ordinary electrolysis do not take place in the electro-extraction process.

There is an exit of a stream of equal numbers of positive and negative ions out of the solution. This stream of positive ions across one gap and a stream of negative ions across the other gap provides the electric current continuity that completes the electric circuit. Each of these branches of the circuit carries chemical constituents attached to their respective ionic charges, outward from the solution leaving the pure (unionized) solution behind.

When the ions exit from the surface of the solution they are transported by an electric field force over to external electrodes where they are electrically neutralized thus forming elemental chemical products outside of the solution. Because of this neutralization and the balanced process of extracting equal numbers of positive and negative ions, no net charge builds anywhere in the system. Hence, the process can run continuously and provide commercial yield. An unbalanced system or a non-neutralizing product collection would build up electrostatic charges that would stop the process with only negligible yield of chemical products and a negligible amount of purification, but the present invention provides a continuous process.

BRIEF DESCRIPTION OF THE DRAWINGS

In the accompanying drawings:

FIG. 1 is a schematic diagram illustrating the basic principle of electro-extraction.

FIG. 2 is a schematic diagram illustrating the principle of focusing the electrical field for improved results.

FIG. 3 is a schematic diagram illustrating the method of focusing the electric field by use of the principle of surface tension and guiding of electric field lines of force through a dielectric material.

FIG. 4 is a schematic cross-section of an apparatus using multiple "launch sites" for extracted ions with focused regions of electric field.

DESCRIPTION OF SPECIFIC EMBODIMENTS

Figure 5:
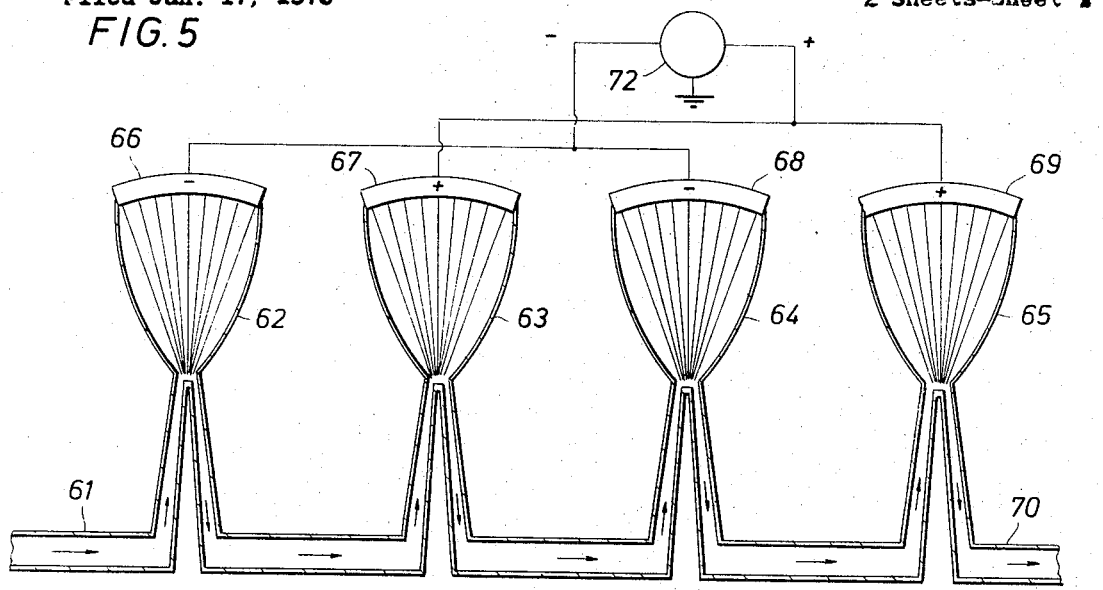
FIG. 5 is a schematic diagram of a continuous flow process for electro-extraction.

It will be appreciated that the present invention can take many forms and embodiments, all of which would be impossible to describe or illustrate here. A limited number of forms of the invention and equipment embodying the invention will be described and illustrated for the purpose of giving an understanding of the invention. The true essence and spirit of the invention is defined in the appended claims, and it is not intended that the limited embodiments described in this specification and shown in the drawings should limit the invention.

The physical principle upon which electro-extraction works is illustrated in FIG. 1. A positive electrode 10, known as anode, and a negative electrode 12, known as cathode, are positioned above the surface 14 of an ioniced solution 16 of sodium chloride in a nonconductive container 17. The anode and cathode are connected by an electric circuit to a source of electric potential indicated schematically by a battery 18. Each of electrodes 10 and 12 are spaced above the surface 14 of the solution to create a gap in which an electric field is created. The voltage provided by source of potential 18 is sufficient to create a strong enough electric field below electrodes 10 and 12 to exert a strong, attractive force on the ions in and just under the surface of the solution. The lines of force created in the electric field are indicated schematically at 20. The strong field below the anode 10 pulls on the negative chlorine ions and the strong field below the cathode 12 pulls on the positive sodium ions. The attractive force of the electric fields is sufficient to provide the respective ions with "escape" energy to extract them from their respective surface areas of the solution. Once the ions are out of the solution they move to their respective electrodes and are discharged and collected as products.

Considerable tension is required to extract the ions out of the surface of an ionized solution. A rule of thumb requirement for adequate extraction rate is that the tension (force per unit area) on these ions must equal or exceed atmospheric pressure. This is comparable to the requirement in distillation that the vapor pressure of the water molecules must equal or exceed atmospheric pressure. The tension can be computed by calculating the force $F=qE$ on a single ion of charge $q$ in the electric field $E$ and dividing by the effective area of the ion. Computations show that the required electric field strength for electro-extraction is well below the breakdown strength of air or other gases in the gap between the surface and the electrodes. These computations show that there is a range of permissible values of the electric field to provide adequate tolerance for commercial design of a desalinization plant based upon the electro-extraction principle.

One additional advantage of the electro-extraction process for removal of ions compared with heat generated vapor pressure in distillation processes is that the force is all directed in the desired extraction direction, whereas the thermal energy produces molecular motions in random directions, thereby losing some of the energy because of the partition of the energy components moving in the wrong direction; hence, the additional advantage of directed application of energy by means of an externally applied electric field.

More force is needed to extract an ion out of the surface than is required to transport it on over to the external electrode where it is electrically neutralized and collected as a chemical product. The use of excessive force in transporting the ion is a waste of energy. Improved efficiency can be achieved by a design configuration of the electrodes and associated free surface areas of the solution that produces the strongest forces only where needed; namely, at the surfaces where the ions are extracted from the solution. Those free surface areas of the solution where ions are extracted will be called the "emitting surfaces," "emitting area," or the "emitters."

One novel embodiment of this invention achieves the stronger force on the ions at the emitting surface by focusing or intensifying the electric field E in the region of the emitting surface as shown in FIG. 2. A portion of an ionized solution 26 is shown with two peak areas of the surface of the solution at 28 and 29 that have an upper surface $A_2$ defining the emitting area. A negative electrode 30 is positioned above the emitting surface 28 and a positive electrode 31 is positioned above the emitting surface 29. A battery 33 is connected to each electrode to provide a source of electrical potential. The intensification of the E field below electrodes 30 and 31 is achieved by employing a large ratio of electrode area $A_1$ to emitting area $A_2$, and by using a configuration that yields a shorter distance between the areas $A_1$ and $A_2$ than between $A_1$ and other surfaces of the solution or any stray conducting area. By this embodiment, essentially all of the lines of force of the E field that originate on the relatively large electrode area $A_1$ go across the gap and converge into the small surface area $A_2$ of the soltuion. This means that the concentration of lines of force of the E field is greater at the solution surface. Since the strength of the E field is proportional to the concentration of lines of force, an intensification of the electric field strength E has been achieved. The intensification is approximately proportional to ratio $A_1/A_2$.

The distance between the small emitter surface area $A_2$ of the solution and the electrode area $A_1$ should be less than the distance between the electrode surface and any other surface of the solution. This desired closeness can be achieved by raising the emitting surface of the solution above the rest of the solution as shown in FIG. 2. The elevation of the emitting surface can be achieved in at least two different ways. One means is to employ a nonconductive housing or piping that constrains the rest of the solution to lower levels, but allows the emitting surface of this solution to rise up to a level that is open to the top (free surface).

Another novel means of achieving an elevation of the emitting surface area $A_2$ is to make use of the property of surface tension as illustrated in FIG. 3. Surface tension causes a liquid to rise up the wall of a solid surface which it wets. Thus an ionized solution 32 placed in a nonconductive container 33 has a wedge portion 36 that rises up to the wall of the container 33.

As an example, the surface tension of salt water will cause it to raise about 0.12 inches on the sides of a plain vertical glass wall. Surface tension will cause a liquid to rise to higher levels in capillary tubes, the height of rise depending upon the diameter of the tube. Hence, surface tension may be employed to raise the emitting surface up to the desired heights above the rest of the solution. Electrodes 40 and 42 may be placed above these raised portions so as to produce strong electric fields 43 and 44 respectively at these emitting surfaces.

One additional desirable feature is achieved by the surface tension embodiment; it provides a small emitter area which means that great intensification of the E field can be achieved with a minimum of voltage between the electrode and the emitter surface. The rise due to surface tension brings a solution up to where the solution forms a thin "wedge shape" such that the solution makes a very small angle with the wall. This means that the "top" of the solution, the emitter surface, is almost a thin line of very small area. This small area meets the requirements for great intensification of the E field at the emitter surface. This novel use of surface tension provides an efficient emitter surface raised above the non-emitting surfaces of the rest of the solution. A lower voltage is required and high efficiency is achieved. The dielectric wall also aids in guiding the electric lines to the emitter area.

Figure 8:
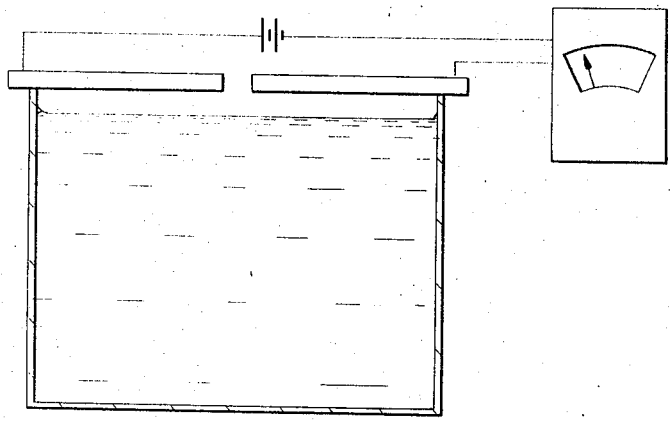
FIG. 8 is a schematic diagram of the apparatus used in Example 1.

FIG. 3 shows placement of the electrodes above and out of contact with the container for one embodiment of electro-extraction. According to another embodiment, however, the electrodes may be placed over and in contact with the rim of the container of the solution as shown in FIG. 8. This enables the dielectric material of the container to guide many more electric lines of force, down to the emitter surface than could be achieved through an air (or vacuum) path with the same voltage. The lines emerge from the container wall at just the right place; namely, where the ions are concentrated along the thin line created by the rise of surface tension. The lines emerging from the high dielectric material produce a greater E field outside of the dielectric where the E field pulls on the ions. The increase in E field is by a factor proportional to the ratio of the dielectric constants of the container (for glass, about 5) to that of the gas outside of the container (about 1 for air). Hence the combination of the dielectric guide effect and the focusing of the E field on a small emitter surface results in a strong electric field achieved where needed without the use of a very high voltage on the electrode. The lower the voltage the greater the efficiency of the electro-extraction process.

In order to increase the total amount of area from which extraction takes place, a multiplicity of raised portions produced by surface tension may be employed. This is achieved by using a multiplicity of walls or other configurations of nonconductive dielectric solids. FIG. 4 illustrates the multiple emitting area principle. Ionized solution 50 is contained in a nonconductive container 52 that has multiple partitions 54a–54j of dielectric solids which provide surfaces for creation of raised portions by surface tension. These partitions may take the form of thin "fins" such as are found in common electric storage batteries or in heat exchange units. A negative electrode 56 of large surface area is positioned above the partitions 54a–54e and a positive electrode 57 of large surface area is positioned above partitions 54f–54j. An electric source of potential 58 is connected to the two electrodes. Each electrode and the associated dielectric guide system creates a very intense electric field at the raised portions created by surface tension. Ions are extracted out of these raised surfaces of the solution according to the principles previously described and are transported up the surface of the guide to the electrode where they are electrically neutralized into elementary chemical products. One electrode may be used above a multiplicity of raised emitter surfaces as shown or a separate electrode may be used above each raised emitter surface. The use of a multiplicity of elevated areas and dielectric guides is needed to increase the rate of yield.

Figure 6:
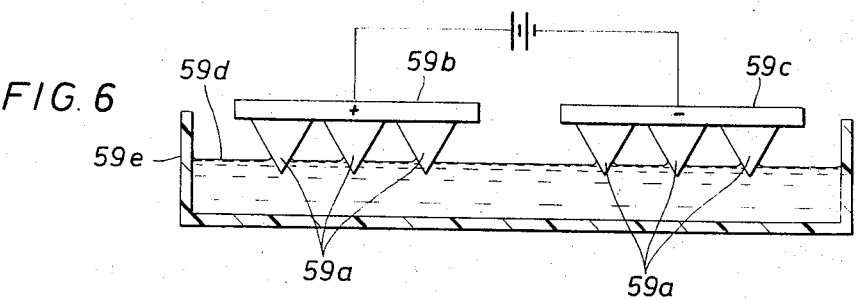
FIG. 6 is a schematic diagram illustrating an embodiment of electro-extraction employing tapered dielectric guides.

Additional refinements to the dielectric guide configurations appear promising: *one* is to taper the shape of the dielectric from a broad cross-sectional area in the region of the electrodes down to a smaller cross-sectional area at the solution, as can be achieved by cones or prisms protruding down from a large area electrode. FIG. 6 illustrates this refinement with dielectric prisms 59a (for example, glass prisms) attached to the electrodes 59b and 59c with the apex of each prism reaching down into the solution 59d within nonconductive container 59e. This tapered configuration of the dielectric guide concentrates even more electric lines into the guide at the desired region, near the emitter sites, yielding a more intense extraction field at that surface.

Figure 7:
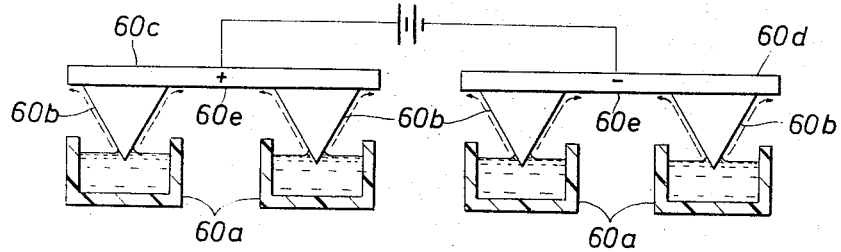
FIG. 7 is a schematic diagram of an embodiment of electro-extraction using dielectric guides for transporting ions over the solution container walls.

FIG. 7 illustrates a *second* refinement; namely the use of a shaped dielectric guide to transport the ions to a desired region where the product is more isolated from the solution. The solution is contained in narrow troughs 60a. Prisms 60b are suspended from electrodes 60c and 60d above the troughs 60a with points dipping slightly into the solution. The ions move up the sides of the prism moving above and over the walls of the trough until they are neutralized at the electrode and are deposited at a product collection area 60e. This is a means of getting the chemical product into a position where it can more readily be removed from the electrodes without "falling" back into the solution.

Having established the basic principle of electro-extraction, other embodiments may be envisioned. For example, instead of using a steady state direct current voltage on the electrodes, a pulse type of potential can be applied. The duration of the pulse can be such that the peak electric field force on the ions is applied only while needed to extract the ions out of the surface. A weaker electric field, or other transport mechanism, may be employed after this group of ions is outside of solution surface to transport them a longer distance to the desired electrode and collection area. Repetition of the pulse, and subsequent transport to the electrode and collection area, is continued to provide a more or less continuous flow of ions in the extraction process.

The collector can be a fixed plate from which the product can be removed as it is accumulated, or a moving plate or belt, or some other moving medium that collects the ion product and carries it to a storage area. Some products, such as chlorine, might be in the form of a gas and can be collected and piped to storage containers.

Another embodiment employs a continuous flow of the ionized solution with the ion extraction taking place from the free surface areas as the solution flows by these areas. Hence, a continuous flow of the solution can be employed with the solution getting purer as it flows along, and the extracted products being continually supplied by continuous extraction from newly arrived solution that contains the impurity. The final outflow is the purified solution.

FIG. 5 illustrates a continuous flow process employing the electro-extraction principle. Saline solution is carried in a pipe 62 into "launch sites" in each of a series of V-shaped vessels 62–65. The solution does not fill the V-shaped vessel. Its level is low enough to yield a small surface area in which an electric field can be concentrated. A series of large electrodes 66–69 are located at the top of each V-shaped vessel and have large surface areas that may be curved to create an additional focusing effect. Electrodes 66–69 are connected to a DC or a pulsating source of electric potential 72 to provide a pulsating electric field which is concentrated on the small surface area of the saline solution found at the bottom of the V-shaped vessels. Note that the polarity of the electrodes alternates down the flow line to provide a balance in the extraction of positive and negative ions.

Each of the V-shaped vessels 62–65 may be filled with a pressurized gas to prevent the saline solution contained in the pipe 60 from rising up too high within the vessel. The pipe 60 and vessels 62–65 are nonconductive so that no free electrons can discharge the ions while in solution. The ions are extracted out of the surface of the solution by the peak electric field and move on over to the electrodes under the influence of a less intense electric field and are neutralized at the electrodes. Chemical products are formed at the electrodes 66–69 at the top of the vessels 62–65 as the ions are neutralized at these electrodes. In order that these uncharged products not fall back into the solution, a transport mechanism such as the power of wind is used to transport the products out to suitable storage bins. The final outflow of the process at the outlet pipe 70 contains the purified solution.

In any of the embodiments of the invention, a multiplicity of electrodes, dielectric guides and emitting surface areas can be employed to provide greater yield. Recycling and continuous flow of the ionized solution may be used to provide greater purity in any of these embodiments.

The solid dielectric guides employed in electro-extraction cause electric lines of force which eminate from the electrodes to be funneled into these guides and exit at the right places to terminate on the ions. These lines exert a tension like stretched rubber bands and pull the ions out of the surface. Some of the lines remain attached to the ions after the ions have been pulled out of the surface of the solution. These lines follow the ions on up the surface of the dielectric guide as the ions move along, staying with the ions until the ions reach the electrode and are neutralized. This "hugging" of the ions to the surface of the dielectric means that most of the length of the electric lines from electrode to ions lies within the dielectric. This dielectric path for the lines means that less voltage is required to produce the tension on the ions than would be so if the electric lines of force were mainly in an equal length of path outside of the dielectric. The physical principle involved is based on the constituent equation $$D = k\epsilon_0 E \quad (1)$$

where $k$ is the dielectric constant of the medium. If $k$ for the dielectric guide is 10, then there is 10 times less voltage required in the dielectric path than for lines in an equal length air path.

The net result is that the solid dielectric guide together with the transport mode of extracting ions from the solution at the guide and moving the ions along the guide surface provides greater efficiency in electro-extraction. Shaping the solid dielectric guide by such shapes as the dielectric prisms in FIG. 6 causes still more lines to be funneled into the guide. The net result is a stronger electric field where the ion is located or less voltage requirement for a given electric field intensity.

CHEMICALS PRODUCED BY THE ELECTRO-EXTRACTION PROCESS

The chemicals produced by the electro-extraction process are separately related to the anions and cations contained in the original saline solution. For example, the cations are extracted from the solution and reach the negative electrodes "intact." An elemental chemical is formed there as this positive ion is neutralized. If this positive ion is a sodium ion, the element sodium is formed by the electrical neutralization. However, since sodium is a very active metal, precautions have to be taken, to preserve it in that elemental form if that is the desired chemical product. Those precautions include an inert electrode, such as graphite, and a neutral atmosphere, such as neon. If a sodium compound is desired, such as sodium hydroxide, water is provided to react with the elemental sodium to yield the desired chemical product.

Similarly the anions are extracted from the solution and reach the positive electrode intact. As they are neutralized there the related elemental chemical is formed. For example, if the negative ion is the chlorine ion it is turned into elemental chlorine. Again precautions must be taken if the elemental chemical is to be the desired product. An inert electrode and a non-reactive atmosphere are employed. If a chlorine compound is desired the other chemical must be provided to react with the neutral chlorine to form the desired chemical product.

The same principle applies to any other ions such as magnesium which is also found in sea water. This principle can be applied to chemical production from any of the other ions in the ionic solution, thus opening up a general new means of chemical production.

Example 1

An experiment was conducted to demonstrate an elementary embodiment of the electro-extraction concept.

Apparatus: The apparatus for the experiment consisted of the solution and electrode configuration similar to that shown in FIG. 8. A drinking glass was nearly filled with a saturated solution in which the solute was sodium chloride (NaCl) in the form of table salt and the solution was water. Two flat plate copper electrodes were placed across the top of the glass so as to have a large gap between the two electrodes but covering the rest of the top of the glass and extending on out over the rim of the glass. An electric power supply and milliammeter were connected in series to the two electrodes to produce a positive voltage on the anode and a negative voltage on the cathode. The solution was insulated from the electrode by the air space between them and by the glass wall upon which the electrodes rest. The saline solution was prepared on the preceding day by adding 10 cm.³ of NaCl to the water in the glass, care being taken not to contaminate the glass insulation above the solution level. Because the solution set overnight the initial temperature of the solution and all other parts of the apparatus were at room temperature. The solution was saturated as evidenced by the excess salt in the bottom of the glass. The dimensions of the glass were: 2$\frac{13}{32}$ in. inside diameter at the top of the glass (whose walls slanted slightly inward), 4$\frac{13}{16}$ in. height, and 0.075 in. thickness of the glass wall in the top portion of the glass but with a slightly larger beaded rim at the top of the glass.

Due to the surface tension, the solution rose up to slightly higher level along the walls of the glass than in the other portions of the surface of the solution. In the middle of the glass the depth of the surface of the liquid below the top of the glass was measured by means of a depth micrometer at three locations to be 0.190 in., 0.188 in. and 0.184 in. The rim of the glass was not perfectly flat nor level, and contributed to the variations in the readings. The depth of the solution at the wall location was higher, of course, and was more difficult to measure, but this depth was measured to be on the average about 0.105 in.

Procedure: A total voltage of 110 volts DC was applied to the electrodes. Since the electrodes were not in contact with the solution, but were about equal height above the solution, the voltage between each electrode and the solution was about 55 volts. A small voltage loss does take place within the solution where a small ion current flows during the extraction process, but it is a very small voltage loss. When the voltage was initially applied only a few microamperes of current flowed, but this current gradually increased until it was up to 4 milliamperes by the end of two minutes and up to six milliamperes by the end of 25 minutes. At this time the voltage was removed and an examination was made of the bottom side of the copper electrodes.

Chemical products had collected on each electrode, along a thin arc that matched the location where the rim of the glass contacted the electrodes. This showed that electro-extraction had taken place from the regions of the solution near the glass wall of the vessel.

The chemical product on each of the electrodes appeared to be dry, but it was just barely wet enough to register a color change on litmus paper when the paper was pressed tightly against the product. The chemical product on the cathode where the Na+ ions were collected and electrically neutralized, turned the litmus paper blue, indicating that at least some of this product is basic. The chemical product on the anode, where the Cl− ions were collected and electrically neutralized, turned the litmus paper red, indicating that at least some of this product is acidic. The bulk of the chemical product collected on the anode appeared to be white, but showed other colors around the edge and throughout the product when examined by means of a magnifying glass. The chemical product collected on the cathode was very dark and the colors difficult to identify. The two products appeared to be quite different, as would be expected.

No complete chemical analysis of the product was made. The simplest chemical explanation, however, based on the litmus test is that:

1. The Na+ ions reaching the cathode reacted with water after being neutralized, to form some NaOH. This would turn the litmus paper blue. The water would be available in the water vapor, in the air above the solution to react with sodium, a very active element.

2. The Cl− ions reaching the anode could react, after being neutralized, with water as follows:

$$Cl_2 + H_2O \rightleftharpoons HCl + HClO \qquad (2)$$

This product would turn the litmus paper red.

The litmus test was also applied to the solution before and after application of voltage to the electrodes. The litmus did not indicate any noticeable change in the PH of the solution, indicating that no chemical reaction took place in the solution, only extraction of ions out of the solution.

Gain increase computations: It has been previously described that the strength of the electric field can be increased by focusing it upon a small emitter surface such as on the portion that rises up due to surface tension on the wall of the container and due to the "piping" of extra lines of force through the dielectric medium of the container. The following computations show the effect of this increase in gain. This computation is based upon the equation $$E \geq \frac{AP}{q} \qquad (3)$$

where P is atmospheric pressure, $q$ is the charge on ion and A is the equivalent area of the ion. This computation yields a required value of E of about 100,000 volts per meter for an approximate area of the sodium ion of $1.6 \times 10^{-19}$ m.$^2$ and a charge $q$, of $1.6 \times 10^{-19}$ coulomb.

In this example the distance between the electrode and the main body of the surface of the solution is about 4.8 mm. (0.188 in.), the voltage is 55 volts from which the electric field E can be computed at 11,000 volts per meter. That is much less than the required 100,000 volts/meter. Hence, no electro-extraction took place from that portion of the surface and no product was observed on the electrodes over that region.

Now consider the space between the electrodes and the elevated area of the solution at the walls of the glass container as 2 mm. (0.080 in.). For a uniform field the electric field can be computed by dividing this distance into the 55 volts to compute the electric field as E=27,000 volts/meter. This would not be a sufficiently large field for extraction of the ions. However, the field here is not uniform but has the gains previously described due to piping and focusing. The actual E field has been increased by a factor of more than 4. Consequently, electro-extraction was achieved out of these raised areas near the glass wall, but not from the middle areas of the surface of the solution. The chemical products clearly formed above the emitter areas near the glass wall is in accord with this basic theory underlining the electro-extraction concept.

Example 2

The following example is intended to provide an even more obvious demonstration of the electro-extraction principle where the electrodes are definitely separated from the surface of the solution. From preliminary experiments it was seen that if caution were not taken to position the electrodes far enough away from the solution, the solution would rise up enough to contact the electrode when the electric field was applied. The dielectric property of the solvent (water) in the solution is the cause of the slight rise under the influence of the electric field. Hence, the electrodes must be placed far enough above the level of the solution to be out of range of this rise.

Apparatus: The apparatus in this example was quite similar to the apparatus shown in FIG. 8 except that a glass beaker was used instead of a drinking glass. A 250 ml. glass beaker was filled up to its spout level with saturated solution of sodium chloride and water. Two electrodes consisting of flat pieces of copper-clad printed circuit boards (copper clad on the electrode side and fiber glass on the other side). These electrodes rested on top of the rim of the glass beaker—well above the solution level. The spout acted as a spillway and any excess solution flowed out without ever reaching the level of the electrodes. This spillway is $3/16$ in. below the rim of the beaker. This provided a "natural" means of making sure that the electrodes were positioned far enough above the solution so that there is never any contact between the solution and the electrodes. An electric power supply with a switch for setting the output voltage at either 400 volts DC or 800 volts DC is connected in series with the milliammeter so as to provide the positive voltage on the anode and the negative voltage on the cathode.

Procedure: Since the spacing between the solution and the electrode was larger than that employed in Example 1, higher voltage was needed. At first 800 volts was applied, providing about 400 volts between each electrode and the solution. The initial current was 0.06 milliamps. It gradually increased during the first five minutes until it reached 0.30 milliamps at which time the voltage supply was switched down to 400 volts; providing about 200 volts between each electrode and the solution. The current dropped down to about 0.12 milliamps and stayed within the range of 0.12 milliamps to a maximum of 0.18 milliamps for the next 15 minutes. There was a somewhat gradual increase in the current up to a maximum of 2.1 milliamps after a total elapsed time of one hour and 6 minutes.

Chemical products: Chemical products were formed on each electrode and on the rim of the beaker, adjacent to the products on the electrodes. The products were too dry to affect litmus paper when pressed against them. The product on the anode was bluish white with some other colors around the edges. The product on the anode was broader than the rim of the beaker with this product accumulating over a width of about ⅓ inch and a length of almost one inch. It had formed not only at the rim but had accumulated inward a small distance also. There was an appreciable amount of this product also left on the rim of the beaker when the electrode was taken off for observation. Similarly, there was another kind of chemical product on the cathode and the adjacent rim of the beaker. It looked dark and the colors difficult to describe. The product on the cathode formed in a distinct mark matching the rim of the beaker and was about one inch long.

Conclusions: Example 2 clearly shows that the ions were extracted from the saline solution. Litmus tests of the solution made before and after the extraction showed no change in pH. There was no evidence of any diffusion of products back into the solution. Hence the only action in the solution was a small current putting the ions in a position to be extracted and the actual extraction of ions from the solution. This depletion of ions would have purified the solution, except in this case as in Example 1, there was an excess of sodium chloride in the beaker and it resaturated the solution.

What is claimed to have been invented or discovered is:

1. A process for removing ions from an ionized aqueous solution comprising the steps of:
externally applying an electric field to extract ions out of the surface of the solution and to transport the ions away from the solution;
electrically neutralizing the extracted ions into uncharged elementary chemicals separately related to the ions; and
collecting separate resulting chemical products outside of the solution.

2. A process according to claim 1 wherein the electric field is focused on a small area of the surface of the solution.

3. A process according to claim 1 wherein at least a pair of electric fields of opposite polarity are applied to the surface of the solution to attract an equal number of ions of opposite polarity which are removed from the solution, thereby providing a steady process by eliminating charge buildup.

4. A process according to claim 1 wherein the ionized solution is seawater.

5. A process according to claim 1 wherein a steady state electric field is applied.

6. A process according to claim 1 wherein a pulsating electric field is applied.

7. A process according to claim 1 wherein a second electric field is applied to transport the ions extracted from the surface of the solution to a storage area.

8. A process according to claim 1 wherein wind is used to transport the elementary chemicals to a storage area.

9. A process according to claim 1 wherein the electric field is applied to a small portion of the surface of the solution raised above the main body of the solution.

10. A process according to claim 1 wherein the electric field is guided to the surface of the solution through at least one guide of dielectric material to increase the intensity of the electric field which intersects the surface of the solution and aids transporting extracted ions along its surface to the electrode.

11. A process according to claim 1 wherein the guide is in the shape of a prism with its apex adapted to dip into the surface of the solution.

12. A process according to claim 1 wherein the electric field is applied to a raised portion of the surface of the solution created by surface tension against a solid surface.

13. A process according to claim 1 wherein the solution is flowed by the region of a series of electric fields of alternating polarity.

14. A process according to claim 13 wherein the solution is recycled through the series of electric fields.

15. A method of purifying seawater comprising the steps of:
applying an electric field to the surface of the seawater to attract ions of salt to and out of the surface;
neutralizing the ions into uncharged elementary chemicals;
collecting the resulting chemical products in a storage area outside of the seawater, leaving only a residue of purified water with no external constituents introduced.

16. A process for producing chemical products related to ions found in an aqueous solution, comprising the steps of:
externally applying an electric field to extract ions out of the surface of the solution and to transport the ions away from the solution;
electrically neutralizing the extracted ions into uncharged elementary chemicals, separately related to the ions; and
collecting separate resulting chemical products outside of the solution.

17. A process according to claim 16 further comprising the step of reacting a desired chemical substance with the ions extracted from the solution to produce a desired chemical compound.

18. A process according to claim 16 wherein the electric field is foccused on a small area of the surface of the solution.

19. A process according to claim 16 wherein at least a pair of electric fields of opposite polarity are applied to the surface of the solution to attract an equal number of ions of opposite polarity which are removed from the solution, thereby providing a steady state process with no charge buildup.

20. A process according to claim 16 wherein a steady state electric field is applied.

21. A process according to claim 16 wherein a pulsating electric field is applied.

22. A process according to claim 16 wherein a second electric field is applied to transport ions from the surface of the solution to a storage area.

23. A process according to claim 16 wherein wind is used to transport the elementary chemicals to a storage area.

24. A process according to claim 16 wherein the electric field is applied to a small portion of the surface of the solution raised above the main body of the solution.

25. A process according to claim 16 wherein the electric field is guided to the surface of the solution through a dielectric material to increase the intensity of the electric field which intersects the surface of the solution.

26. A process according to claim 16 wherein the electric field is applied to a raised portion of the surface of the solution created by surface tension against a solid surface.

27. A process according to claim 16 wherein the solution is flowed by the region of a series of electric fields of alternating polarity.

28. A process according to claim 27 wherein the solution is recycled through the series of electric fields.

29. A process according to claim 16 wherein an atmosphere of inert gas is maintained above the surface of the solution and in the vicinity of extracted ions until neutralization occurs.

References Cited
UNITED STATES PATENTS

| | | | |
|---|---|---|---|
| 3,129,157 | 4/1964 | Loeckenhoff | 204—180 R |
| 3,147,329 | 9/1964 | Gage | 75—10 R X |
| 3,501,289 | 3/1970 | Finkl et al. | 75—10 R X |
| 3,586,613 | 6/1971 | Stewart | 204—64 R X |
| 3,684,667 | 8/1972 | Sayce | 204—140 X |
| 3,728,241 | 4/1973 | Shelley et al. | 204—164 |

JOHN H. MACK, Primary Examiner

A. C. PRESCOTT, Assistant Examiner

U.S. Cl. X.R.

204—180 R